United States Patent [19]

Jaffe et al.

[11] Patent Number: 5,410,727
[45] Date of Patent: Apr. 25, 1995

[54] INPUT/OUTPUT SYSTEM FOR A MASSIVELY PARALLEL, SINGLE INSTRUCTION, MULTIPLE DATA (SIMD) COMPUTER PROVIDING FOR THE SIMULTANEOUS TRANSFER OF DATA BETWEEN A HOST COMPUTER INPUT/OUTPUT SYSTEM AND ALL SIMD MEMORY DEVICES

[75] Inventors: Robert S. Jaffe, Shenorock, N.Y.; Hungwen Li, Monte Sereno, Calif.; Margaret M. L. Kienzle, Somers, N.Y.; Ming-Cheng Sheng, Kaoshiung, Taiwan, Prov. of China

[73] Assignee: International Business Machines Corporation, Armonk, N.Y.

[21] Appl. No.: 157,232
[22] Filed: Nov. 22, 1993

Related U.S. Application Data

[63] Continuation of Ser. No. 426,140, Oct. 24, 1989, abandoned.

[51] Int. Cl.6 .................... G06F 5/06; G06F 13/12; G06F 15/16; G06F 7/00
[52] U.S. Cl. .................... 395/800; 395/250; 395/275; 395/425; 364/DIG. 1; 364/231.9
[58] Field of Search .............. 395/800, 375, 275, 425, 395/200

[56] References Cited

U.S. PATENT DOCUMENTS

| | | | |
|---|---|---|---|
| 3,287,703 | 11/1966 | Slotnick | 395/800 |
| 3,936,806 | 2/1976 | Batcher | 340/172.5 |
| 3,979,728 | 9/1976 | Reddauay | 340/172.5 |
| 4,065,808 | 12/1977 | Schomberg et al. | 395/325 |
| 4,101,960 | 7/1978 | Stokes et al. | 395/800 |
| 4,380,046 | 4/1983 | Prosch et al. | 395/800 |
| 4,380,046 | 4/1983 | Forsl et al. | 395/800 |
| 4,481,580 | 11/1984 | Martin et al. | 395/325 |
| 4,484,262 | 11/1984 | Sullivan et al. | 395/425 |
| 4,514,807 | 4/1985 | Nogi | 364/200 |
| 4,523,273 | 6/1985 | Adams, III et al. | 395/800 |
| 4,546,433 | 10/1985 | Tucker | 364/200 |
| 4,601,055 | 7/1986 | Kent | 382/49 |
| 4,665,556 | 5/1987 | Fukushima et al. | 382/41 |
| 4,707,781 | 11/1987 | Sullivan et al. | 395/425 |
| 4,709,327 | 11/1987 | Hillis et al. | 395/375 |
| 4,727,474 | 2/1988 | Batcher | 395/800 |
| 4,773,038 | 9/1988 | Hillis et al. | 395/500 |
| 4,783,738 | 11/1988 | Li et al. | 395/800 |
| 4,901,224 | 2/1990 | Ewert | 364/200 |
| 4,972,314 | 11/1990 | Getzinger et al. | 364/200 |
| 5,081,575 | 1/1992 | Hiller et al. | 395/325 |
| 5,136,717 | 8/1992 | Morley et al. | 395/800 |
| 5,148,547 | 9/1992 | Kahle et al. | 395/800 |

FOREIGN PATENT DOCUMENTS 2160685 12/1985 United Kingdom .

OTHER PUBLICATIONS

D. Parkinson et al., "The AMT DAP 500," Compcon 88-Thirty IEEE Computer Society International Conference, San Francisco, Calif., Spring 1988, IEEE, New York, pp. 196-199.

Wiackless; Massively parallel computer for Digital Signal and Image Processing; May 1989 IEEE.

Roberts; Recent developments in parallel processing; IEEE.

*Primary Examiner*—Alyssa H. Bowler
*Assistant Examiner*—L. Donoghue
*Attorney, Agent, or Firm*—Scully, Scott, Murphy & Presser

[57] ABSTRACT

A two-dimensional input/output system for a massively parallel SIMD computer system providing an interface for the two-way transfer of data between a host computer and the SIMD computer. A plurality of buffers equal in number, and distributed with the individual processing elements of the SIMD computer are used to provide a temporary storage area which allows data in different formats to be mapped in a format suitable for transfer to the host computer or for transfer to the SIMD processing elements. The temporary storage is controlled in such a way as to transfer entire blocks of data in a single SIMD system clock cycle thereby achieving an input/output data rate of N bits/cycle for a SIMD computer consisting of N processors. The system is capable of handling irregular as well as regular data structures. The system also emphasizes a distributed approach in having the input/output system divided into N pieces and distributed to each processor to reduce the wiring complexity while maintaining the I/O rate.

45 Claims, 6 Drawing Sheets

INPUT/OUTPUT SYSTEM FOR A MASSIVELY PARALLEL, SINGLE INSTRUCTION, MULTIPLE DATA (SIMD) COMPUTER PROVIDING FOR THE SIMULTANEOUS TRANSFER OF DATA BETWEEN A HOST COMPUTER INPUT/OUTPUT SYSTEM AND ALL SIMD MEMORY DEVICES

This is a continuation of application Ser. No. 426,140 filed on Oct. 24, 1989, now abandoned.

BACKGROUND OF THE INVENTION

1. Field of the Invention

This invention relates to an input/output system for SIMD parallel computers, and more particularly, to a distributed input/output system using a temporary storage buffer, individual for each processing element of the SIMD computer, capable of providing a two-dimensional data transfer scheme that substantially increases the I/O rate of the SIMD system.

2. Discussion of the Prior Art

Scientists and engineers from all disciplines have become dependent upon computers to further their work, and with this dependancy they have grown to expect the performance of these computers to increase by an order of magnitude approximately every five years. This trend of increasing computer performance in the order of magnitude range is slowing, in fact, the supercomputers presently available may already be within an order of magnitude of their technological limit. Heretofore, the limit was approximately 3 gigaflops which corresponds to approximately 3 billion floating point instructions per second, which is a function of the length of time it takes electrical signals to propagate through various wires and interconnections at approximately one half the speed of light. The drawback of the prior art system is that many of the problems facing todays scientists and engineers can only be solved utilizing computers with performance capabilities far exceeding the 3 gigaflop limit.

Recent advances in supercomputer performance have been achieved by dividing applications among many processors working in parallel. Theoretically, parallel processing computers should provide performance in the teraflop range. While these computers provide increased capacity and speed, they also provide a new set of problems, namely, programming the new computers, handling the input/output operations and manipulating the data. The programming difficulties stem from the fact that no matter how well a program is written, it is extremely hard to achieve 100 percent utilization of multiple processors. The problem of handling input/output (I/O) operations and data manipulation arises because of the sheer volume of data associated with these types of computers. The programming problem may resolve itself with experience while the I/O and data manipulation problems can be lessened by improving the input/output systems for the computers.

Figure 1:
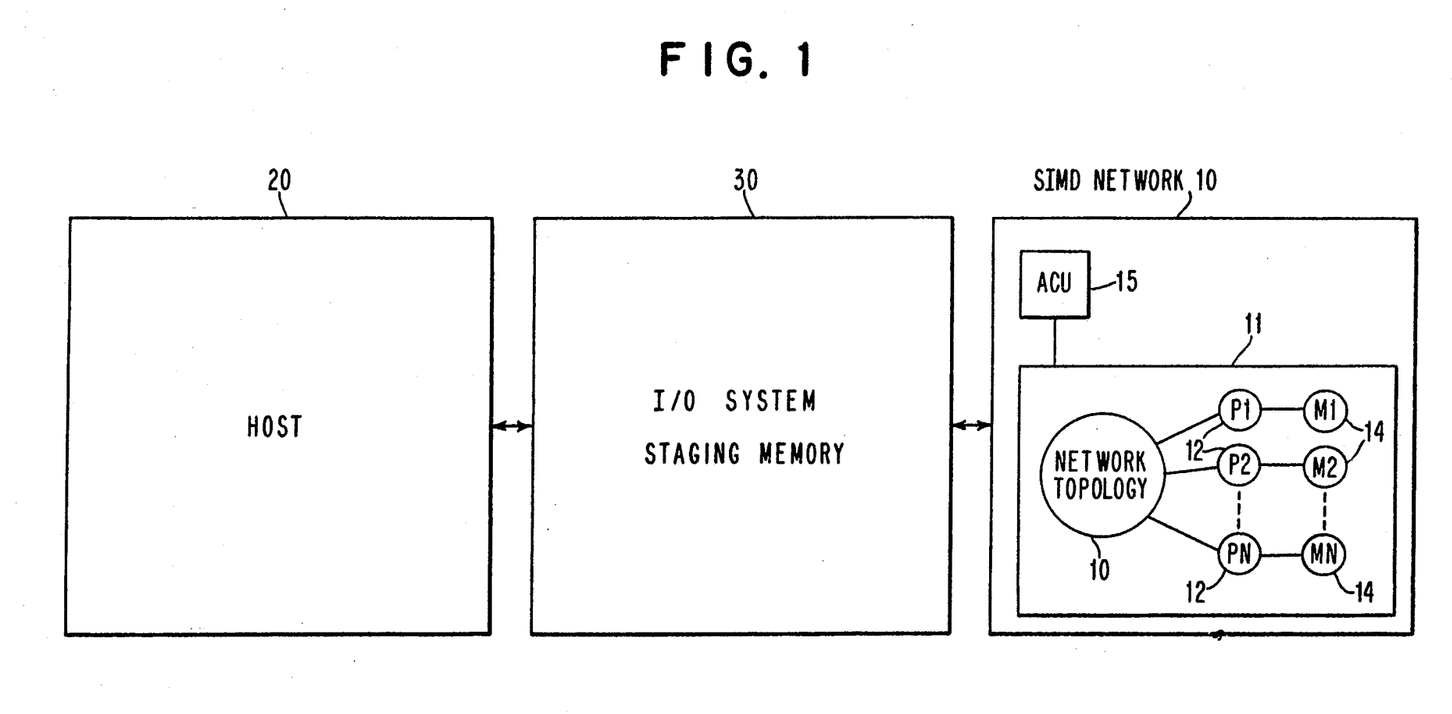
FIG. 1 is a block diagram of a prior art SIMD computer system.

As shown in FIG. 1, a conventional SIMD (single instruction multiple data) parallel system includes a SIMD computer 10 interacts with a host computer 20 via an I/O subsystem 30. The SIMD computer 10 consists of a processor array 11, that includes a plurality of processors 12, numbered P1, P2 . . . PN, each of which is a very simple CPU, a network 13 to connect the processors 12, a memory 14 for each processor, numbered M1, M2 . . . MN, and a control unit 15 to issue instructions and clock pulses to the processors. The I/O subsystem 30, typically comprises a staging memory that is responsible for transferring data between the SIMD computer 10 and the host 20.

In fine-grained, massively parallel SIMD systems, one single instruction after another is broadcast simultaneously to the processor array, with each instruction being applied to different pieces of data.

Traditionally, fine grained SIMD parallel systems devoted their application emphasis to image-oriented computing which resulted in the input/output system being designed only to handle regularly structured two-dimensional data such as image or matrix data. The input/output rate of a SIMD computer system was typically low due to the fact that for a N-processor SIMD system, arranged as a $\sqrt{N} \times \sqrt{N}$ mesh, only $\sqrt{N}$ items of data are input or output to or from the system per machine cycle. Most fine grained SIMD parallel systems are connected by mesh networks and their input/output is done by shifting data between a host and one boundary row/column of the SIMD system. This type of data transfer is considered one dimensional. In addition, data must be pre-arranged by the host such that a particular datum can be assigned to a desired processor. The low input/output rate and restricted capability in handling only regular data structures effectively confine SIMD computers to a narrow application domain.

A second disadvantage of the mesh oriented row/column shifting scheme used in the prior art SIMD input/output systems is the difficulty in programming. Since the input/output function is overlapped with the current task execution, the programmer must interleave the instructions for computing with the instructions for input/output. This situation may lead to a very unreadable code as well as force the programming to stay at the assembly language level.

A third aspect of the prior art input/output subsystems presently employed by SIMD computers is the handling of the corner turning function. The corner turning function is a phenomenon due to the different arrangement of data at the host and SIMD systems. For example, N 32-bit words are arranged in the host as N consecutive words, each being 32-bits wide. However, in transfer, these data words are distributed among 32 planes of SIMD memory with each plane containing N bits, each of which is associated with one processor. This situation arises due to the fact that in the SIMD system, all processors need to access the same memory location in the same machine cycle and the plane organization supports such memory accessing. The corner-turning of regular data structures such as image or matrix is supported by mesh-oriented row/column shifting. However, corner-turning for irregular data structures is not supported by the prior art row/column shifting I/O scheme.

As noted above, prior art input/output systems are presently implemented as a centralized piece of hardware, such as a staging memory. This approach requires the centralized input/output system to connect to all processors and as a result, many wires are needed for the input/output system. U.S. Pat. No. 4,727,474 to Batcher discloses a staging memory for a massively parallel computer. The staging memory is a very complex interface between host memory and local processor memory. This network is capable of buffering, permutating, and shuffling of the data. The circuitry to implement this scheme is complex, requires several stages and is not easily distributed to a very large number of processors.

The mesh-oriented row/column shifting scheme is a compromise, because it connects the input/output system to the boundary of the mesh in order to save wires, but, this in turn, reduces the input/output rate of the system.

U.S. Pat. No. 4,380,046 to Fung discloses a massively parallel processor computer which utilizes a one-dimensional input/output scheme. The disclosed input/output system serves as a storage element for input and output operations. The instantaneous logical state of a bidirectional data bus utilized by the system can be stored into the input/output system in a one bit register and similarly, the logical state of the one bit register can be read out to the data bus. The disclosed input/output system is capable of shifting bits to the input/output system in neighboring processing elements. The bits are shifted only in a single direction and thus for a mxm processing element array, one bit slice data stream array will require m shifting operations to move the data array into the processing element array. Thus, there is a need for an I/O system that reduces wiring complexity while maintaining a high input/output rate.

SUMMARY OF THE INVENTION

The present invention is directed to an input/output system for a massively parallel SIMD computer providing a two-dimensional data transfer scheme between a host computer and the SIMD computer. The SIMD computer is a single instruction, multiple data computer having a parallel array processor comprising a plurality of parallel linked processors each being associated with one of a plurality of SIMD memory devices. The input/output system comprises a temporary storage means for the bi-directional, two-dimensional transfer of data between the host computer and the SIMD computer, and an input/output processing means for controlling the flow of data between the host computer and the temporary storage means, and for controlling the flow of data between the temporary storage means and the plurality of SIMD memory devices. The temporary storage means comprises, in an illustrative embodiment of the invention, a plurality of buffers with each one of the plurality of buffers being directly associated with one of the plurality of the SIMD memory devices, and a control circuit means for providing timing and selection signals for the transfer of data between the host computer and the temporary storage means and also between the temporary storage means and the SIMD memory devices. The temporary storage means accomplishes the transfer of data by distributing the data over the plurality of buffers in a predetermined two-dimensional pattern and arranging the data in a format suitable for transfer, in a single system clock cycle.

The input operation of the input/output system of the present invention is a two step process which involves the transfer of data from the host computer memory to the plurality of buffers in the first step and the transfer of data from the plurality of buffers to the SIMD memory devices in the second step. For the transfer of data from the host computer to the plurality of buffers, the input/output processing means writes the I/O data pointer, which is the starting address of the block of data in the host memory to be transferred, and the I/O data length, which is the total number Of items to be transferred, to the input/output device of the host computer. Upon completion of the I/O data pointer and the I/O data length transfer, the input/output processing means invokes the transfer of data. The block of data from the host computer memory is distributed to M segments of continuous buffers of the plurality of buffers by having M pairs of segment starting addresses and segment lengths loaded into an address queue of an address generation unit located in the I/O processing means. The manipulation and control of this data transfer is accomplished by the input/output processing means and the control circuit means. For the transfer of data from the plurality of buffers to the SIMD memory devices, the input/output processing means loads the starting address of the SIMD memory devices and length into the address generation unit and then invokes the transfer of data. Once again, the manipulation and control of this data transfer is accomplished by the input/output processing means and the control circuit means. The transfer of data between the host computer memory and the plurality of buffers is accomplished over the input/output channel while the transfer of data between the plurality of buffers and the plurality of SIMD memory devices is done by a local data bus.

The output operation of the input/output system of the present invention is also a two step process which involves the transfer of data from the plurality SIMD memory devices to the plurality of buffers in the first step and the transfer of data from the plurality of buffers to the host computer memory in the second step. The output operation requires the reverse action and functions of the input operation.

The input/output system of the present invention provides, for a N-processor system, a two-dimensional input/output scheme that supports an input/output rate at a factor of $\sqrt{N}$ higher than the row/column shifting input/output systems utilized in the prior art. The two-dimensionality allows for the efficient transfer of regular data structures as well as for the transfer of irregular data structures, such as sparse matrix or graphic data. This capability permits a user to map data into the processor in an arbitrary predetermined pattern. The present invention is also a distributed architecture which reduces wiring complexity between the input/output system and the SIMD computer. In addition, the input/output system separates input/output programming from computing which reduces the programming effort for a parallel system.

The present invention finds utility in that by incorporating the temporary storage means as an integral and distributed component of the input/output system, two-dimensional data transfer can be accomplished thereby increasing the input/output data rate from $\sqrt{N}$ bits/cycle to N bits/cycle. This type of input/output system greatly increases operating efficiency of any SIMD computer system and can be employed in a plurality of SIMD computer systems since it is independent of the network connecting the processors. The addressing scheme utilized by the input/output system allows the present invention to be utilized by networks using mesh, polymorphic-torus, hypercube and other network connection topologies.

DESCRIPTION OF THE PREFERRED EMBODIMENT

Figure 2:
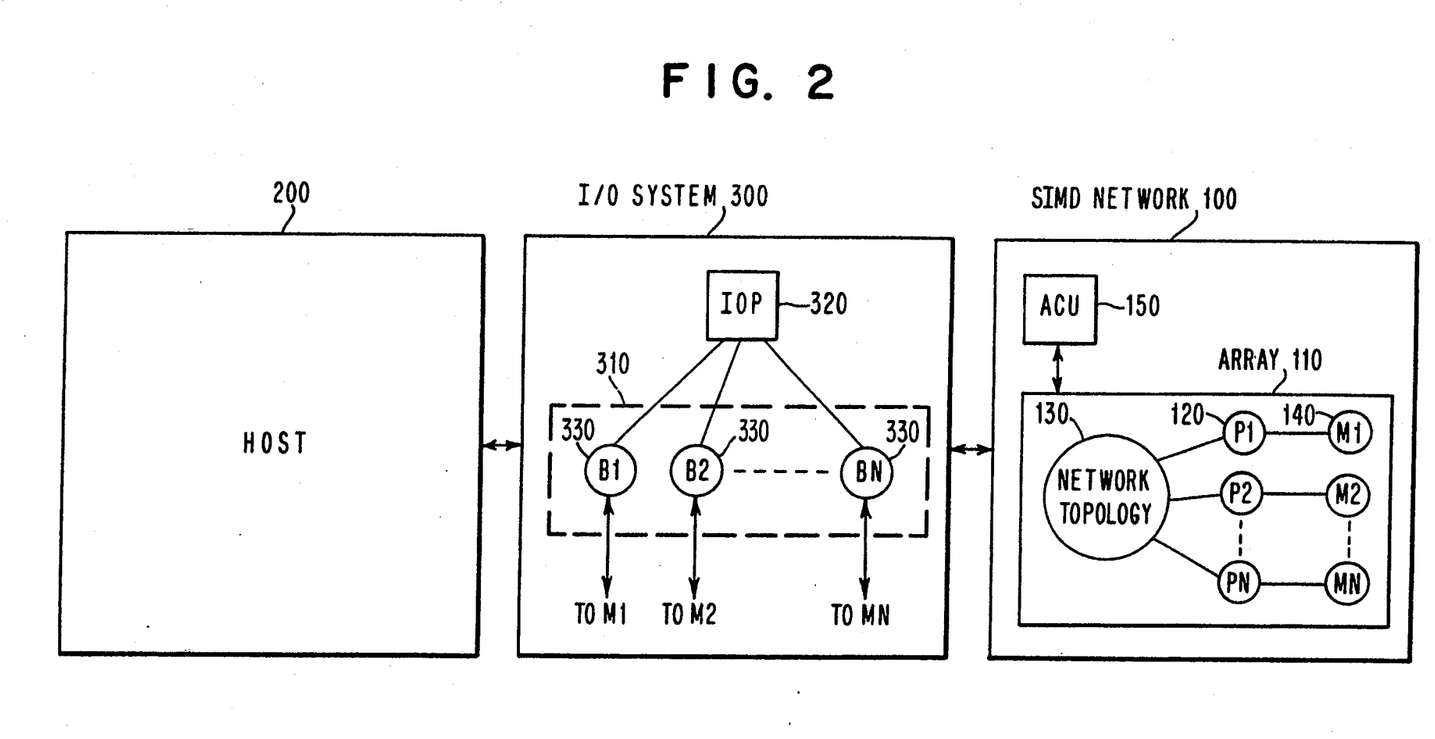
FIG. 2 s a block diagram of a SIMD computer system with one representation of the input/output system of the present invention.

The input/output system for a massively parallel SIMD computer system is responsible for transferring data between the SIMD computer and its host. FIG. 2 illustrates the basic blocks of a SIMD computer system. The system includes, a host computer 200, which can be a main frame computer or a microprocessor and associated memory, a SIMD computer 100, and an input/output system 300 connecting the host computer 200 and the SIMD computer 100. The input/output system 300 of the present invention provides for the bi-directional, two-dimensional transfer of data between the host computer 200 and the SIMD computer 100.

The SIMD computer 100 comprises a processor array 110 having a plurality of processing elements 120, numbered P1, P2 ... PN, a network 130 which connects the individual processing elements 120 and a plurality of SIMD memory devices 140, numbered M1, M2 ... MN. The SIMD computer 100 is a parallel array processor having a great number of individual processing elements 120 linked and operated in parallel. The SIMD computer 100 is massively parallel in that the number N of processing elements 120 is very high, which can be, for example, over one million individual processing elements. The SIMD computer 100 includes a control unit 150 that generates the instruction stream for the processing elements and also provides the necessary timing signals for the computer. The network 130 is an interconnection means for the individual processing elements 120 and can take on many topologies such as mesh, polymorphic-torus and hypercube. The plurality of memory devices 140 are for the immediate storage of data for the individual processing elements 120 and there is a one-to-one correspondence between the number of processing elements 120 and the number of memory devices 140.

The input/output system 300 of the invention includes a temporary storage means 310 coupled to an input/output processor (IOP) 320. The two-dimensional data transfer scheme of the I/O system 300 is provided by the temporary storage means 310. In the illustrative embodiment of FIG. 2, the temporary storage means 310 includes a plurality of buffers 330, numbered B1, B2 ... BN. Each one of the plurality of buffers 330 is associated with one of the plurality of SIMD memory devices 140. The I/O system of the present invention thus utilizes a distributed approach by dividing the I/O data transfer function into N pieces, one for each processor 120. The data to be transferred by the temporary storage means 310 is distributed over said plurality of buffers in a predetermined two-dimensional pattern, and the data is also arranged in a format suitable for transfer, on a single system clock cycle.

Figure 3:
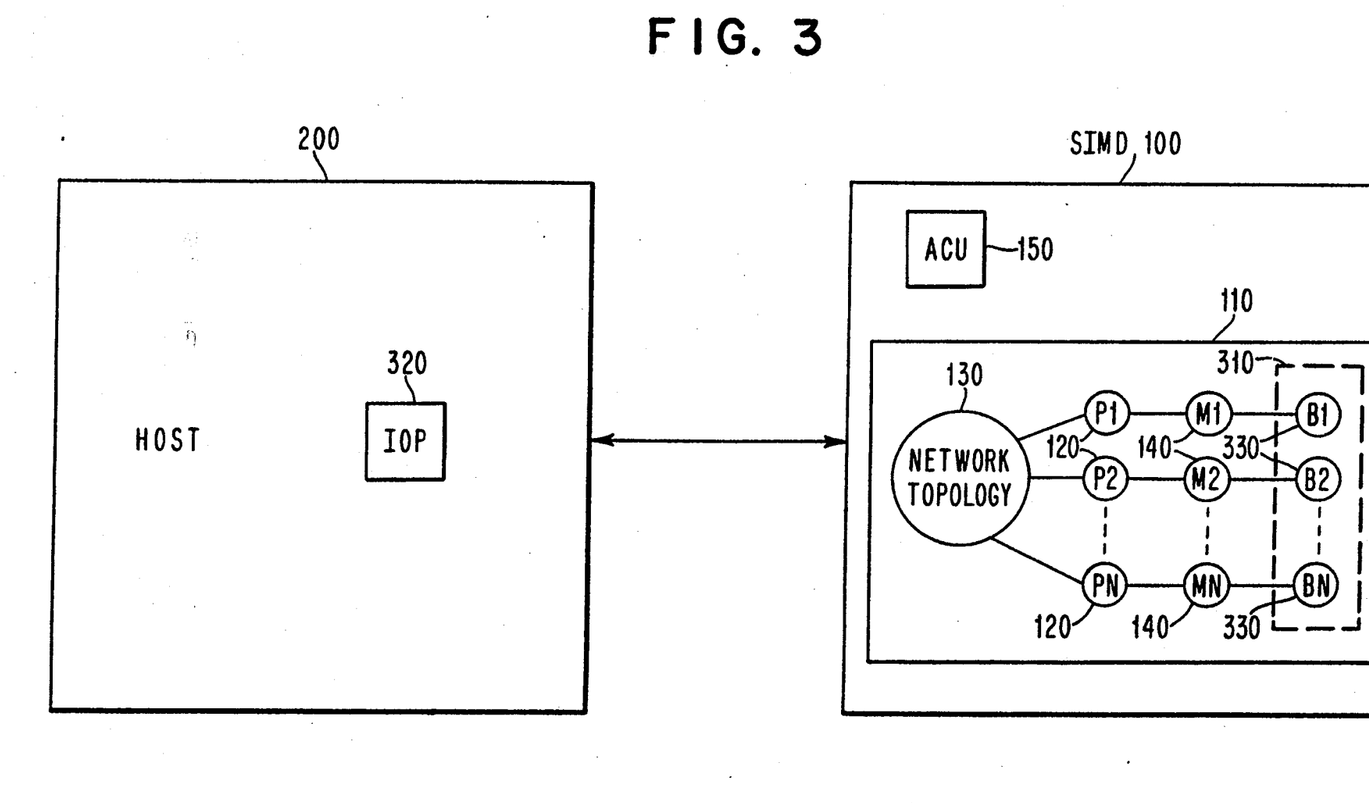
FIG. 3 is a block diagram of a SIMD computer system with another representation of the input/output system of the present invention.

The I/O system 300 of the present invention may be configured as a separate entity as in FIG. 2, or the individual elements may be incorporated into other SIMD system components. For example, the IOP functions may be performed by the host 200 and/or the temporary storage means may be incorporated directly in the SIMD processor array 110. FIG. 3 is a block diagram of a SIMD system utilizing both of the above options.

Figure 4:
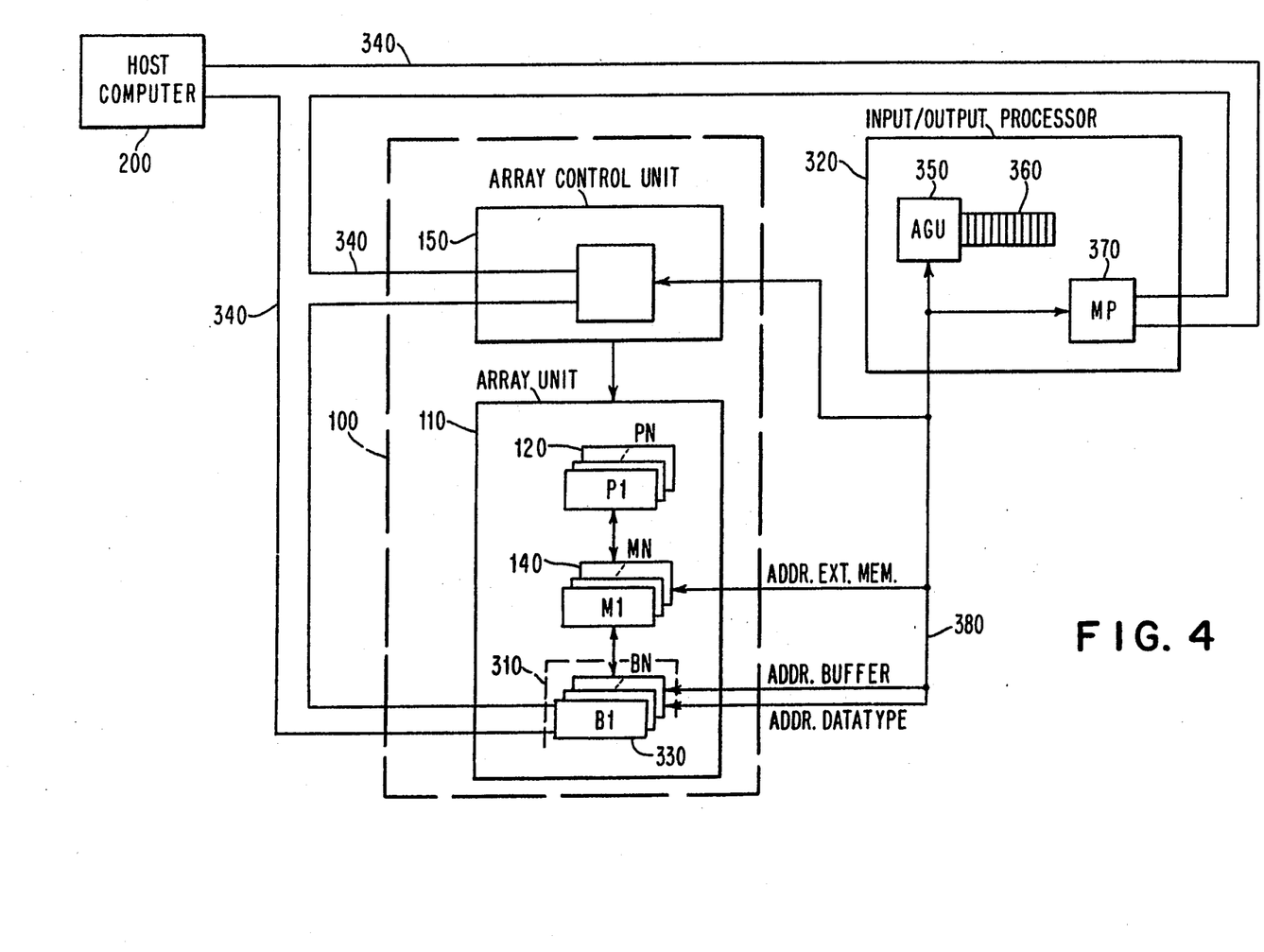
FIG. 4 is a detailed block diagram of a SIMD computer system with another representation of the input/output system of the present invention.

Referring now to FIG. 4, there is shown a detailed diagram of another embodiment of a SIMD system having a host computer 200, a SIMD computer 100 which includes the temporary storage means 310 of the input/output system of the invention incorporated therein and IOP 320 as a separate element. The I/O system further includes an input/output channel 340 which is utilized for the transfer of data between the SIMD computer 100 and the host computer 200. The input/output channel 340 is a n-bit bi-directional data bus which interconnects the host computer 200 and the input/output processing means 320, the host computer 200 and the temporary storage means 310 and the host computer 200 and the array control unit 150. The n-bit bi-directional data bus 340 is capable of handling a multiplicity of data word types depending on the application. For example, the I/O channel 340 may handle single bit, eight bit, sixteen bit and thirty-two bit data words. The input/output processing means 320 controls the overall flow of data in and out of the SIMD computer 100 as well as the flow of data within the computer 100. The input/output processing means 320 is a processor comprising an address generation unit 350, an address queue 360 and a microprocessor and associated memory 370.

The input/output system as stated above is a device capable of the bi-directional two-dimensional transfer of data. Inputting data is accomplished by transferring data from the memory of the host computer 200 to the temporary storage means 310, and then from the temporary storage means 310 to the plurality of SIMD memory devices 140. The outputting of data is accomplished in a similar two-step process wherein the order of the steps comprising the inputting of data is reversed.

INPUTTING DATA FROM HOST TO TEMPORARY STORAGE

To transfer data from the memory of the host computer 200 to the plurality of buffers 330 which comprise the temporary storage means 310, the input/output processor 320 writes the "I/O data pointer", which is the starting address of the data in the memory of the host computer 200 and the "I/O data length", which is the length of the data in 32-bit words, to the I/O device of the host computer 200 which can be any type of I/O device such as a disk drive or a direct memory access device. Upon completion of this transfer of information, the input/output processor 320 invokes the transfer of data from the memory of the host computer 200 to the temporary storage means 310. The microprocessor and memory 370 contains the I/O program responsible for generating the "I/O data pointer" and the "I/O data length" as well as the necessary instructions for invoking the transfer.

The address generation unit 350 is responsible for generating the address for the particular buffers 330. The input/output processor 320 loads a "segment starting address" and a "segment length" into the address queue 360 of the address generation unit 350 and then invokes the address generation unit 350 and the host input/output device simultaneously for the transfer of data. The address generation unit 350 and the I/O device of the host computer 200 must be synchronized for each datum transfer. The address queue 360 is a first in, first out (FIFO) queue capable of storing multiple segments of addresses. For a continuous block of data in the memory of the host computer 200, the data is distributed to M segments of continuous buffers 330. For this transfer, the input/output processor 320 loads M pairs of "segment starting addresses" (SA) and "segment lengths" (L) into the address queue 360 of the address generation unit 350. The sum of the "segment lengths" is equal to the "I/O data length" written to the host input/output device. In response to receiving the M pairs of "segment starting addresses" and "segment lengths", the address generation unit 350 generates the following addresses:

$$SA(1), SA(1) + 1, \ldots, SA(1) + L(1) - 1, \quad (1)$$

$$SA(2), SA(2) + 1, \ldots, SA(2) + L(2) - 1, \quad (2)$$

$$\vdots$$

$$SA(M), SA(M) + 1, \ldots, SA(M) + L(M) - 1. \quad (3)$$

There are certain possible situations or scenarios where the above described transfer procedure is not straight forward; namely, when the block of data to be transferred has an "I/O data length" larger than the given number of buffers and when the block of data has a word size greater than the buffer width typically 32 bits. To transfer a block of data where the "I/O data length" is larger than the given number of buffers, the input/output processor 320 invokes a program run by microprocessor 370 which transfers the entire data block in several steps. The program ensures that in each step the maximum size of the data transfer is smaller than the number of buffers 330. To transfer a block of data with word size greater than the buffer width, the host computer 200 must prepare the data so that word size is no greater than 32.

A third situation that arises with the transfer of data is that of having a data word that is smaller than the buffer width. In this case, the data with a word size smaller than the buffer width can be packed into a 32-bit word in the memory of the host computer 200 and distributed to multiple buffers in a single transfer. For example, four bytes of data can be packed into a single 32-bit word and distributed to four continuous buffers in one single transfer. For such a transfer, the input/output processor 320 loads "segment starting address", "segment length", and also "data type" into the address queue 360 of the address generation unit 350. From this input information, the address generation unit 350 generates ADDRESS.BUFFER and ADDRESS.DATATYPE signals which are carried by signal bus 380 to the temporary storage means 310. ADDRESS.BUFFER is a signal which indicates the identifying number of a particular buffer 330 and ADDRESS.DATATYPE is a two bit information code that indicates how many bits are in a particular data word. The code for ADDRESS.DATATYPE may be as follows: 00 denotes that the data being transferred is single bit type, 01 denotes that the data being transferred is eight bit type, 10 denotes that the data being transferred is sixteen bit type, and 11 denotes that the data being transferred is thirty-two bit type. The temporary storage means 310 is responsible for decoding both the ADDRESS.BUFFER and ADDRESS.DATATYPE. Decoding the ADDRESS.DATATYPE may lead to multiple addressed buffers, for example, in a transfer involving four bytes of data packed into a single 32-bit word, the last two bits of ADDRESS.BUFFER is treated as "don't care", therefore, four buffers are decoded to accept the data. The same 32-bit word is written into four buffers in the same machine cycle. The input/output program executed by microprocessor 370 then rotates the second byte, third byte and the fourth byte into the proper location. The decoding for other data types are performed in a similar manner and the input/output process is completed with the aid of the input/output program contained in microprocessor 370.

Figure 5:
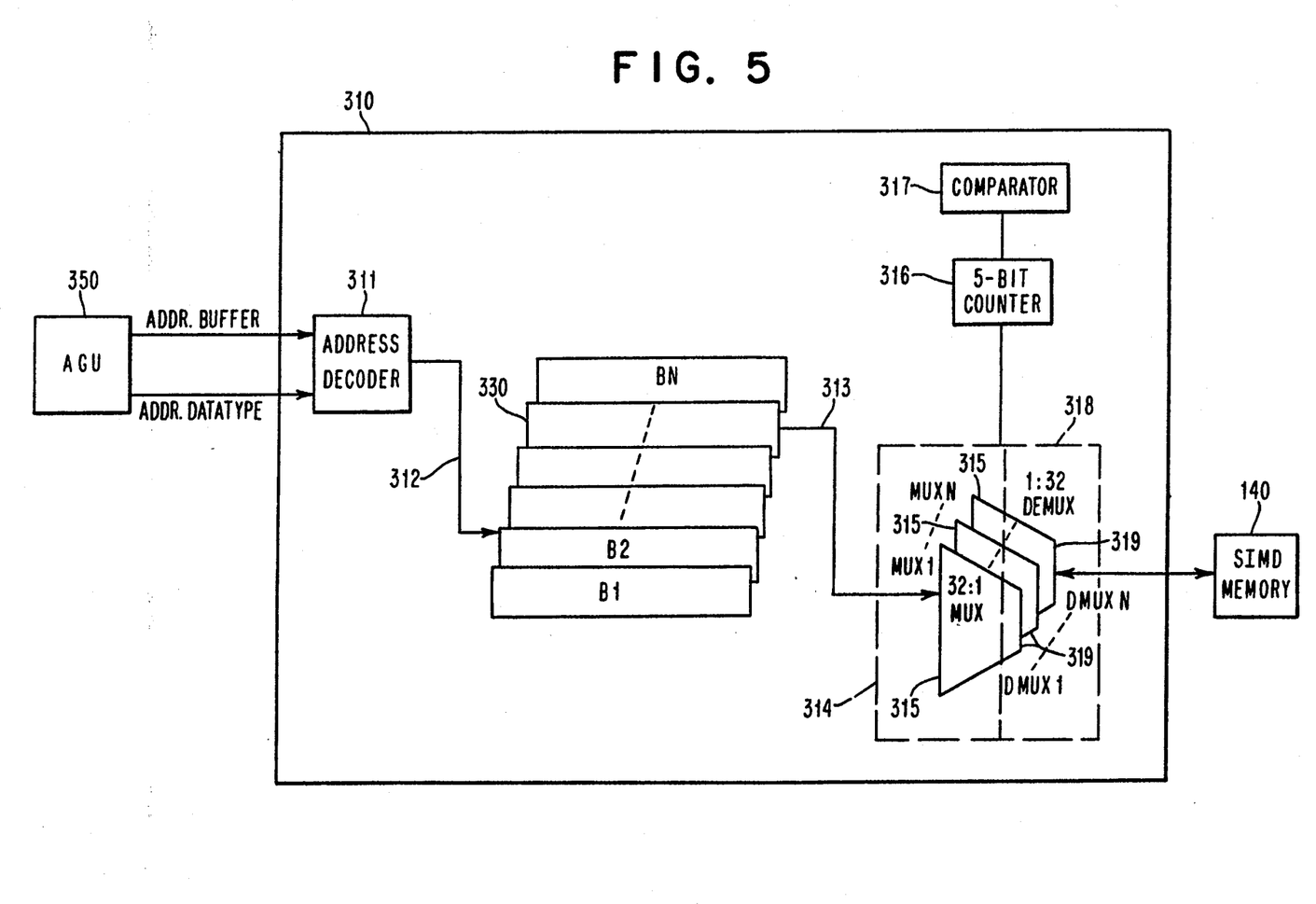
FIG. 5 is a detailed block diagram of the temporary storage means of the present invention.

Turning now to FIG. 5, there is shown a detailed block diagram of one embodiment of the temporary storage means 310. The temporary storage means 310 is shown consisting of the plurality of buffers 330 and its fundamental support components or circuits as well as the address generation unit 350 which supplies two command signals and the SIMD memory 140. The fundamental components are an address decoder 311, a multiplexing circuit means 314 which consists of N multiplexers denoted as MUX1 through MUXN, a demultiplexing circuit means 318 consisting of N demultiplexors denoted as DMUX1 through DMUXN, a counter circuit 316 and a comparator circuit 317. Each of the components is fully explained in subsequent paragraphs in conjunction with a description of the operation of the storage means 310. As was stated previously, the address generation unit 350 outputs ADDRESS.BUFFER and ADDRESS.DATATYPE to the temporary storage means 310. These two signals enter the temporary storage means 310 and are decoded by address decoder 311. The address decoder 311 generates a plurality of enable signals, given by $$EN(i,j) \cdot k \quad (4)$$

where $$1 \leq i \leq \sqrt{N}, \quad (5)$$

$$1 \leq j \leq \sqrt{N}, \quad (6)$$

and $$1 \leq k \leq 32. \quad (7)$$

The matrix space defined by i and j represent the total number of buffers and k represents the total capacity of a particular buffer. The total number of buffers in the system is equal to N; therefore, the total number of enable signals is 32×N. Each enable signal represented by equation (4) and carried on line 312 controls the loading of the associated buffer location 330 (B1, B2 . . . BN). When the enable signal is a logic one or in a high state, the associated buffer location is enabled for loading or storing; otherwise, disabled. For ADDRESS.DATATYPE equal to 11 (32 bit datatype), 32 enable signals, EN(s,t).r are at a high state where s is given by $$s = \text{ADDRESS.BUFFER}/\sqrt{N}, \quad (8)$$

and t is given by $$t = \text{ADDRESS.BUFFER} - (N*s) \quad (9)$$

Note that the division by the $\sqrt{N}$ in equation (8) is an integer division which results in the truncation of the remainder of the division.

For ADDRESS.DATATYPE equal to 10 (16 bit datatype), EN(s,t1).r1 and EN(s,t2).r2 are at high states where s is given by $$s = \text{ADDRESS.BUFFER}/\sqrt{N}, \quad (10)$$

t1 is given by $$t1 = \text{ADDRESS.BUFFER} - (s*N), \quad (11)$$

t2 is given by $$t2 = t1+1, \quad (12)$$

and r1 and r2 are given by $$r1 = r2 = 1, 2, \ldots 16 \quad (13)$$

For buffer datatype equal to 01 (e.g. byte datatype), four bytes of data will be written into 4 contiguous buffer locations starting from address.buffer; and for bit datatype (i.e. buffer datatype equal to 00), 32 continuous buffer locations will be selected (neglecting 5 LSB bits of address.buffer). The calculation of the enable signals are similar to that of the byte datatype.

Figure 6:
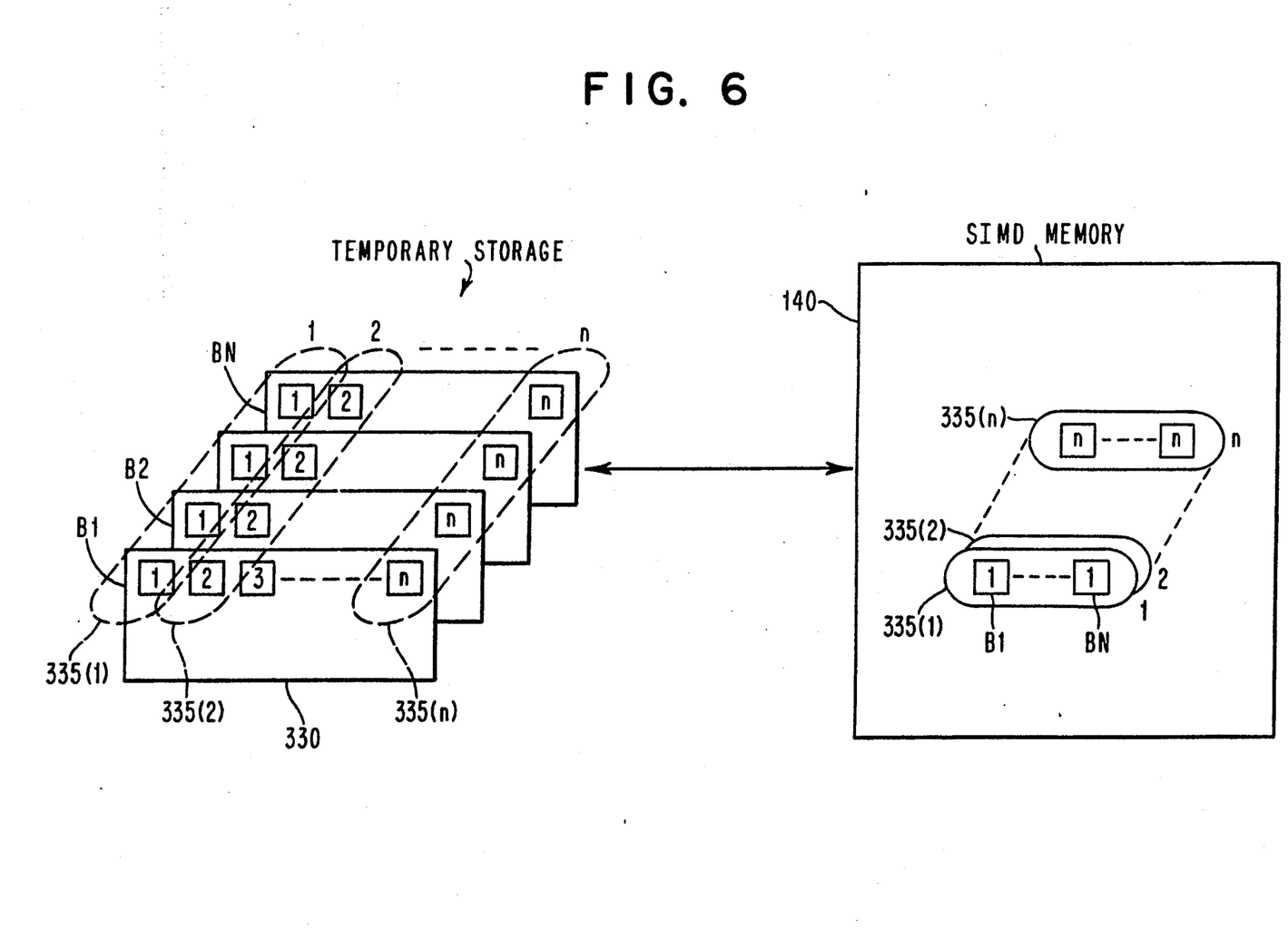
FIG. 6 is a representation of the mapping scheme for the transfer of data by the input/output system of the present invention.

The address decoder 311 accepts the ADDRESS.BUFFER and ADDRESS.DATATYPE from the input/output processor 320 and generates the plurality of enable signals. This procedure is used to load the data from the host computer 200 into the buffers 330. Bascially, the data from the host computer 100 is distributed as n-bit words with N addresses. FIG. 6 illustrates the two-dimensional mapping scheme of the present invention. As is shown in this Figure and stated above, the data from the host computer is distributed over the plurality of buffers as n-bit words with N addresses. Each buffer, denoted as B1 through BN represent the starting address for each of the n-bit words. In the illustrative embodiment of the invention, n can be a single bit, eight bits, sixteen bits and thirty-two bits. By generating all the enable signals for a given n-bit word of data, the transfer of the data from the host computer 200 is accomplished in a single system clock cycle. The next step in the process is to transfer the data from the buffers 330 to the SIMD memory devices 140 which occurs in the next system clock cycle.

INPUTTING DATA FROM TEMPORARY STORAGE TO SIMD MEMORY

Referring once again to FIG. 4, the plurality of SIMD memory devices 140 are shown connected between the temporary storage means 310 and the SIMD processing elements 120. The SIMD memory devices 140 comprises the memory area that interfaces with the buffers 330 and is separately addressable by the address generation unit 350. The SIMD memory is organized as a N-bit wide and D-bit deep memory where N is the total number of processors in the system and D is a choice of implementation. The SIMD memory can be viewed as D planes each of which consists of N bits of memory. Each bit in a particular plane is denoted as ADDRESS.EXTMEM.BIT which ranges from 0, 1 .. . N−1.

For this transfer, the N buffers 330 are organized as 32 planes each containing N bits. Each buffer plane is addressed by ADDRESS.BUFFER.PLANE. For each system clock cycle, the bits at ADDRESS.BUFFER.PLANE of the buffer at ADDRESS.BUFFER are transferred to the bits at ADDRESS.EXTMEM.BIT of SIMD memory at ADDRESS.EXTMEM. The input/output processor 320 is responsible for inputting the data from the buffers to the SIMD memory. The input/output processor 320 loads the address generation unit 350 with "SIMD memory starting address" and "SIMD length" then invokes the address generation unit 350 to start the transfer.

Referring now to FIG. 5, the exact mechanism for the transfer is explained. A multiplexer/demultiplexer means 314 contains N 32-to-1 multiplexers 315 which selects one out of the 32 locations of the N buffers. All the multiplexers 315 together provide N bits to the plurality of SIMD memory devices 140. The selection control of the multiplexers 315 is provided by a counter means 316 which consists of one 5-bit counter. The 5-bit counter is reset to 0 by the input/output processor 320 upon completion of a write cycle. The counter 316 accepts ADDRESS.DATATYPE from the input/output processor 320 and decodes the ADDRESS.DATATYPE as the length of the word and then stores the length into a comparator 317. For every internal clock cycle, the content of the counter 316 is compared with that of the comparator 317. When equal, a STOP signal is generated to stop the counting, thus indicating that the transfer is complete.

Referring once again to FIG. 6, the n-bit words from the host computer are arranged for transfer to the SIMD memory 140. The first bit location of each buffer, B1 through BN is grouped and denoted as 335(1), the second bit location of each buffer is grouped and denoted as 335(2), and the nth bit location of each buffer is grouped and denoted 335(n). These groupings represent the n planes of memory to be transferred to the SIMD memory 140 from the temporary storage means 330. This Figure represents a grouping of all N buffers; however, as was stated previously, in any particular transfer from the host computer to the temporary storage means, the data is distributed to M segments of buffers where M does not have to correspond to N. Therefore, each of the groupings that represent the n planes of memory need only contain the M locations of data and not N locations. These n planes are addressed by n addresses and each plane contains N bits of data.

OUTPUTTING DATA

The output operation of the input/output system is also a two-step process, namely, the transfer of data from the SIMD memory 140 to the temporary storage means 310 and the transfer from the temporary storage means 310 to the memory of the host computer 200.

The transfer of data from the SIMD memory to the buffers of the temporary storage means is the reverse action of inputting data from the buffers to the SIMD memory. In the inputting process, n-bit words are written to N addresses by a plurality of multiplexers. In the outputting process N words addressable by n addresses are transferred to the buffers 330 by means of demultiplexing means 318 which consists of N 1-to-32 demultiplexers 319. The demultiplexers 319 are controlled by the counters 316 and the comparator 317 in exactly the same manner as described in the inputting process.

The transfer of data from the buffers to the memory of the host computer is the reverse action of inputting from the host to the buffers. In the inputting process, the enable signals determined which buffer can be written to, and in the reverse process, the same enable signals determine which buffers can be read from. The control of this process is by means of the input/output program of the input/output processor.

Turning back to FIG. 6, the n planes of data represented by 335(1) through 335(n) in the SIMD memory 140 are arranged for transfer to the temporary storage means 330. The n planes 335(1) through 335(n) are addressed by N addresses wherein each plane shall contain N addresses for relocation in the temporary storage means.

The concept behind the present invention is a two stage mapping process for the rapid, bi-directional transfer of data between a host computer and a SIMD system. In the transfer of data from the host to the SIMD network the data from the host memory is mapped or distributed over M continuous buffers in a single system clock cycle. In the next clock cycle the data in the M continuous buffers is then distributed over 32 planes of SIMD memory. In the transfer of data from the SIMD network to the host, the data in the SIMD memory is distributed over M continuous buffers in a single system clock cycle. In the next clock cycle the data in M continuous buffers is transferred to the memory of the host computer. As was stated previously, this manipulation of data allows for an increase in data rate of $\sqrt{N}$ for a N processor SIMD system.

The N processors of the SIMD computer can be implemented in a variety of topologies. The preferred topology is to distribute the N processors over a plurality of circuit boards but have collections of processors implemented in a single chip. When each processor in the system is equiped with an associated memory, buffer and a multiplexer/demultiplexer combination and when each collection of processors has an address decoder, a counter and a comparator, then the mapping scheme in FIG. 6 is fully realized. The distributed concept or approach described above has the benefit in VLSI implementation because the wiring between the buffer and the processor/memory can become intrawire connections within a single chip. This distributed approach greatly reduces the wiring bottleneck in implementing a massively parallel fine grained SIMD computer.

Although shown and described in what are believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere to all modifications that may fall within the scope of the appended claims.

What is claimed is:

1. An input/output (I/O) system for a massively parallel, single instruction, multiple data (SIMD) computer providing bi-directional, two-dimensional data transfer between a host computer and said SIMD computer, wherein the data transfer is two-dimensional because data comprising N words each word up to n-bits in length is simultaneously transferred one N-bit plane at a time between the host computer I/O system and all SIMD memory devices of the SIMD computer, said SIMD computer comprising a parallel array processor comprising N a parallel linked processors, with each processor being coupled to an associated one of N SIMD memory devices, each of said N SIMD memory devices organized as D memory planes each comprising N bits, said input/output system comprising:

(a) a temporary storage means coupled between said host computer and said N SIMD memory devices for the bi-directional, two-dimensional transfer of data between said host computer and said SIMD computer, wherein said temporary storage means includes N corner turning buffers, each one of said plurality of corner turning buffers being coupled with one of said N SIMD memory devices;

(b) an input/output processing means, controlled by a system clock which generates clock cycles, for controlling the flow of data between said host computer and said N corner turning buffers, and for controlling the flow of data between said N corner turning buffers and said N SIMD memory devices, said input/output processing means distributing the N words of up to n-bits length each of data from the host computer to said N corner turning buffers and arranging said data therein as n memory planes each comprising N bits therein, each of said n memory planes corresponding to an associated one of said D memory planes of said SIMD memory, and further distributing said N words of up to n-bits length each to said corresponding SIMD memory devices of the SIMD computer one N-bit plane at a time in a single system clock cycle.

2. The input/output system of claim 1 wherein said temporary storage means includes a control circuit means for providing timing and selection signals for the transfer of data between said host computer and said N corner turning buffers and for the transfer of data between said N corner turning buffers and said SIMD memory devices.

3. An input/output (I/O) system for a massively parallel, single instruction, multiple data (SIMD) computer providing two-dimensional data transfer between a host computer and said SIMD computer, wherein the data transfer is two-dimensional because data comprising N words each word up to n-bits in length is simultaneously transferred one N-bit plane at a time between the host computer I/O system and all SIMD memory devices of the SIMD computer, said SIMD computer having a parallel array processor comprising N parallel linked processors, with each processor being coupled to an associated one of N SIMD memory devices, each of said N SIMD memory devices organized as D memory planes each comprising N bits, said input/output system comprising:

(a) an input/output channel for the transfer of data between said SIMD computer and said host computer;

(b) a temporary storage means connected between said input/output channel and said N SIMD memory devices for the bi-directional, two-dimensional transfer of data between said host computer and said SIMD computer said temporary storage means comprising:

(i) N corner turning buffers, each one of said N corner turning buffers being coupled with one of said N SIMD memory devices, and (ii) a control circuit means for providing timing and selection signals for the transfer of data between said host computer and said N corner turning buffers and for the transfer of data between said N corner turning buffers and said N SIMD memory devices; and (c) an input/output processing means, controlled by a system clock which generates clock cycles, for controlling the flow of data between said host computer and said N corner turning buffers, and for controlling the flow of data between said N corner turning buffers and said N SIMD memory devices, said input/output processing means distributing the N words of up to n-bits length each of data from said host computer to said N corner turning buffers and arranging said data therein as n memory planes each comprising N bits therein, each of said n memory planes corresponding to an associated one of said D memory planes of said SIMD memory, and further distributing N words of up to n-bits length each to said corresponding SIMD memory devices of the SIMD computer one N-bit plane at a time in a single system clock cycle.

4. The input/output system of claim 3 wherein said input/output channel is a n-bit bi-directional data bus that interconnects said host computer and said input/output processing means, said host computer and said temporary storage means, and said host computer and an array control unit.

5. The input/output system of claim 3 wherein each of said plurality of N corner turning buffers is a 32-bit buffer.

6. The input/output system of claim 3 wherein each of said plurality of N corner turning buffers is independently addressable by said input/output processing means.

7. The input/output system of claim 6 wherein said N corner turning buffers are addressable by the host computer or the input/output processing means as N addressable words each having n bits.

8. The input/output system of claim 3 wherein said N corner turning buffers are addressable by the SIMD array of processors as n addressable words each having N bits.

9. The input/output system of claim 3 wherein said N corner turning buffers are addressable by said host computer as n-bit words distributed over M segments of contiguous buffers wherein a total of M Segment starting addresses and M segment lengths are generated by said input/output processing means to accommodate the transfer of a continuous block of data from said host computer to said buffers, and the sum of the segment lengths is less than or equal to N.

10. The input/output system of claim 3 wherein said control circuit means comprises address decoding means for generating a N corner turning enable signals for the transfer of data to a predetermined number of said plurality of buffers.

11. The input/output system of claim 10 where said control circuit means further includes:
multiplexer means for determining which one of n locations of the predetermined number of N corner turning buffers from which data is to be transferred to associated SIMD memory devices in a single clock cycle; and
demultiplexer means for determining which one of n locations of the predetermined number of N corner turning buffers to which data is to be transferred from associated SIMD memory devices.

12. The input/output system of claim 10 wherein said address decoding means generates said plurality of enable signals from a buffer identification code and a data type code received from said input/output processing means.

13. The input/output system of claim 11 wherein said control circuit means further includes:
counter means which provides control signals for controlling said multiplexer means and said demultiplexer means; and
comparator means for determining the top count for said counter means.

14. The input/output system of claim 13 wherein said comparator means compares the count of said counter with said word length and upon a match provides a stop signal to said counter.

15. The input/output system of claim 13 wherein said counter means comprises one 5-bit counter, said counters provide selection control for said multiplexers and said demultiplexers.

16. The input/output system of claim 15 wherein said counter receives said data type code from said input/output processing means and decodes said data type code as the length of the word and stores the length into said comparator means.

17. The input/output system of claim 11 wherein said multiplexer means comprises N 32-to-1 multiplexers, each of said N 32-to-1 multiplexers corresponding to an associated corner turning buffer; said N 32-to-1 multiplexers providing N bits of data from an n memory plane to an associated D memory plane of said N SIMD memory devices in a single clock cycle.

18. The input/output system of claim 17 wherein said demultiplexer means comprises N 1-to-32 demultiplexers, said demultiplexers providing N bits of data from one D memory plane of said N SIMD memory devices to an associated n memory plane of said N corner turning buffers in a single clock cycle.

19. The two-dimensional input/output system of claim 3 wherein said input/output processing means comprises:
(a) an address generation unit for generating the address for a particular buffer of said plurality of buffers and for generating the address for a particular memory device from said plurality of SIMD memory devices; and
(b) a microprocessor and associated memory for generating all control signals for said flow of data.

20. The input/output system of claim 19 wherein said address generation unit comprises an address queue which provides a string of buffer addresses that are sequentially followed.

21. The input/output system of claim 20 wherein said microprocessor and associated memory contain the input/output program which generates said plurality of control signals.

22. The input/output system of claim 21 wherein said input/output processing means further comprises a program which prepares data for transfer from said host computer to said plurality of buffers when data length is greater than the number of said plurality of buffers.

23. A single instruction multiple data (SIMD) processor comprising:
(a) a parallel array processor comprising N parallel linked processors, with each being coupled to an associated one of N SIMD memory devices;
(b) an array control unit for controlling said N parallel linked processors; and
(c) an input/output system, controlled by a system clock which generates clock cycles, for said single instruction multiple data processor providing two-dimensional data transfer between a host computer and said plurality of parallel linked processors, wherein the data transfer is two-dimensional because data comprising N words each word up to n-bits in length is simultaneously transferred one N-bit plane at a time between the host computer I/O system and all SIMD memory devices of the SIMD computer, said input/output system comprising:

(i) an input/output channel for the transfer of data between said SIMD computer and said host computer;

(ii) a temporary storage means connected between said input/output channel and said N SIMD memory devices for the bi-directional, two-dimensional transfer of data between said host computer and said SIMD computer, said temporary storage means comprising N corner turning buffers each one of said N corner turning buffers being directly coupled with one of said [plurality of said N SIMD memory devices, and a control circuit means for providing timing and selection signals for the transfer of data between said host computer and said N corner turning buffers and also between said N corner turning buffers and said N SIMD memory devices; and (iii) an input/output processing means, controlled by a system clock which generates clock cycles, for controlling the flow of data between said host computer and said N corner turning buffers, and for controlling the flow of data between said N corner turning buffers and said N SIMD memory devices.

24. The single instruction multiple data processor of claim 23 wherein said input/output channel is a n-bit bi-directional data bus that interconnects said host computer and said input/output processing means, said host computer and said N corner turning buffers, and said host computer and an array control unit.

25. The single instruction multiple data processor of claim 24 wherein each of said N corner turning buffers is independently addressable by said input/output processing means.

26. The single instruction multiple data processor of claim 25 wherein said N corner turning buffers are addressable by the SIMD array of processors as n addressable words each having N bits.

27. The single instruction multiple data processor of claim 25 wherein said N corner turning buffers are addressable by the host computer or the input/output processing means as N addressable words each having n bits.

28. The single instruction multiple data processor of claim 27 wherein said N corner turning buffers is addressable by said host computer as n-bit words distributed over M contiguous buffers wherein a total of M segment starting addresses and M segment lengths are generated by said input/output processing means to accommodate the transfer of a continuous block of data from said host computer to said buffers, and the sum of the segment lengths is less than or equal to N.

29. The single instruction multiple data processor of claim 28 wherein said control circuit means comprises an address decoding means for generating a plurality of enable signals for the transfer of data to a predetermined number of said plurality of buffers.

30. The single instruction multiple data processor of claim 29 wherein said control circuit means further comprises:

multiplexer means for determining which one of n locations of the predetermined number of N corner turning buffers from which data is to be transferred to associated SIMD memory devices in a single clock cycle; and demultiplexer means for determining which one of n locations of the predetermined number of N corner turning buffers to which data is to be transferred from associated SIMD memory devices.

31. The single instruction multiple data processor of claim 30 wherein said control circuit means further comprises:

(a) counter means which provides control signals for controlling said multiplexer means and said demultiplexer means; and (b) comparator means for determining the top count for said counter means.

32. The single instruction multiple data processor of claim 23 wherein said input/output processing means comprises:

(a) an address generation unit for generating the address for a particular buffer of said plurality of buffers and for generating the address for a particular memory device from said plurality of SIMD memory devices; and (b) a microprocessor and associated memory for generating all control signals for said flow of data.

33. The single instruction multiple data processor of claim 32 wherein said address generation unit comprises an address queue which provides a string of buffer address' that are sequentially followed.

34. The single instruction multiple data processor of claim 33 wherein said microprocessor and associated memory contain the input/output program which generates said plurality of control signals.

35. The single instruction multiple data processor of claim 34 wherein said input/output processing means further comprises a program which prepares data for transfer from said host computer to said plurality of buffers when data length is greater than the number of said plurality of buffers.

36. A single instruction multiple data (SIMD) processor comprising:

(a) a parallel array processor comprising parallel linked processors, with each processor being coupled to an associated one of N SIMD memory devices;

(b) an array control unit for controlling said N parallel linked processors; and (c) an input/output (I/O) system for said single instruction multiple data processor providing two-dimensional data transfer between a host computer and said plurality of N parallel linked processors wherein the data transfer is two-dimensional because data comprising N words each word up to n-bits in length is simultaneously transferred one N-bit plane at a time between the host computer I/O system and all SIMD memory devices of the SIMD computer, said input/output system comprising:

(i) a temporary storage means coupled between said host computer and said N SIMD memory devices for the bi-directional, two-dimensional transfer of data between said host computer and said SIMD computer, wherein said temporary storage means includes N corner turning buffers, each one of said N corner turning buffers being coupled with one of said N SIMD memory devices; and (ii) an input/output processing means, controlled by a system clock which generates clock cycles, for controlling the flow of data between said host computer and said N corner turning buffers, and for controlling the flow of data between said N corner turning buffers and said N SIMD memory devices.

37. A single instruction multiple data processor of claim 36 wherein said temporary storage means includes a plurality of buffers, each one of said plurality of buffers being coupled with one of said plurality of SIMD memory devices.

38. A single instruction multiple data processor of claim 37 wherein said temporary storage means includes a control circuit means for providing timing and selection signals for the transfer of data between said host computer and said temporary storage means and for the transfer of data between said temporary storage means and said SIMD memory devices.

39. A method for providing bi-directional, two-dimensional inputting and outputting of data between a host computer and a massively parallel, single instruction, multiple data (SIMD) computer having a parallel array processor comprising N parallel linked processors with each processor being coupled to an associated one of N SIMD memory devices, said method comprising the steps of:

(a) when inputting data to said SIMD computer, first transferring data under the control of a system clock which generates clock cycles, between said host computer and a temporary storage means of said SIMD computer, said temporary storage means including N corner turning buffers, each one of said N corner turning buffers being coupled with one of said N SIMD memory devices, wherein each said data transfer is a two-dimensional transfer in a single system clock cycle because data comprising N words each word up to n-bits in length is simultaneously distributed one N-bit plane at a time between the host computer and all N corner turning buffers of the SIMD computer and arranged therein as n memory planes each comprising N bits; and further (b) transferring N words of up to n-bits each between said temporary storage means and said plurality of N SIMD memory devices one N-bit plane at a time in each system clock cycle; and (c) when outputting data to said host computer from said SIMD computer, first transferring N words of up to n-bits each between said plurality of SIMD memory devices and said N corner turning buffers of said temporary storage means one N-bit plane at a time in each system clock cycle; and further (d) distributing data from said N corner turning buffers to a predetermined area of host computer memory in each system clock cycle.

40. The method of claim 39 wherein the step of distributing data from said host computer further includes the steps of:

(a) generating a plurality of enable signals for the transfer of data to a predetermined number of said N corner turning buffers; and (b) transferring the data from said host computer to M segments of contiguous buffers of said N corner turning buffers addressable as n-bit words having N addresses, where N equals the number of said plurality of buffers and n is equal to the width of an individual buffer of said plurality of buffers.

41. The method according to claim 39 wherein the step of transferring data between said temporary storage means and a plurality of SIMD memory devices comprises the steps of:

(a) distributing data from said N corner turning buffers over a plurality of planes which comprise said plurality of SIMD memory devices in a first single system clock cycle, wherein each of said plurality of planes comprises a distribution of data in a two dimensional pattern for the simultaneous transfer of data to and from all SIMD memory devices of the SIMD computer; and (b) distributing data from said plurality of planes over a plurality of n corner turning buffers which comprise said temporary storage means in a second single system clock cycle.

42. The method according to claim 41 wherein the step of distributing data from said plurality of planes further includes the steps of:

(a) determining by means of a demultiplexer which one of n locations of said plurality of buffers to which data is to be transferred from said plurality of planes; and (b) transferring the data from said plurality of planes to M segments of contiguous buffers of said plurality of buffers addressable as n bit words having N addresses, where N equals the number of said plurality of buffers and n is equal to the width of an individual buffer of said plurality of buffers.

43. The method according to claim 42 wherein said step of determining the m locations includes the step of generating a set of control signals for controlling said demultiplexer.

44. The method according to claim 41 wherein the step of distributing data from said temporary storage means further includes the steps of:

(a) determining by means of a multiplexer which one of n locations of said N corner turning buffers from which data is to be transferred to said SIMD memory devices; and (b) transferring the data from said temporary storage means to said plurality of planes addressable as N-bit words having n addresses, where N equals the number of said plurality of buffers and n is equal to the width of an individual buffer of said plurality of buffers.

45. The method according to claim 44 wherein said step of determining the n locations includes the step of generating a set of control signals for controlling said multiplexers.

* * * * *

UNITED STATES PATENT AND TRADEMARK OFFICE
CERTIFICATE OF CORRECTION

PATENT NO. : 5,410,727
DATED : April 25, 1995
INVENTOR(S) : Robert S. Jaffe, et al.

It is certified that error appears in the above-indentified patent and that said Letters Patent is hereby corrected as shown below:

On the Title Page, Section [56], line 6, delete the following: "4,380,046 4/1983 Prosch et al. .........395/800" and line 7: "Forsl" should read -- Frosch --
Column 3, line 66: "Of" should read --of--

Signed and Sealed this

Twentieth Day of February, 1996

Attest:

BRUCE LEHMAN

Attesting Officer     Commissioner of Patents and Trademarks